(12) United States Patent
Fujibayashi et al.

(10) Patent No.: US 9,942,562 B2
(45) Date of Patent: Apr. 10, 2018

(54) VIDEO PREDICTIVE ENCODING DEVICE, VIDEO PREDICTIVE ENCODING METHOD, VIDEO PREDICTIVE ENCODING PROGRAM, VIDEO PREDICTIVE DECODING DEVICE, VIDEO PREDICTIVE DECODING METHOD, AND VIDEO PREDICTIVE DECODING PROGRAM

(71) Applicant: NTT DOCOMO, INC., Chiyoda-ku, Tokyo (JP)

(72) Inventors: Akira Fujibayashi, Tokyo (JP); Choong Seng Boon, Tokyo (JP); Thiow Keng Tan, Jalan Sindor (SG)

(73) Assignee: NTT DOCOMO, INC., Tokyo (JP)

( * ) Notice: Subject to any disclaimer, the term of this patent is extended or adjusted under 35 U.S.C. 154(b) by 448 days.

(21) Appl. No.: 14/584,439

(22) Filed: Dec. 29, 2014

(65) Prior Publication Data
US 2015/0117529 A1  Apr. 30, 2015

Related U.S. Application Data

(63) Continuation of application No. PCT/JP2013/062061, filed on Apr. 24, 2013.

(30) Foreign Application Priority Data

Jul. 2, 2012 (JP) ................. 2012-148310

(51) Int. Cl.
*H04N 19/507* (2014.01)
*H04N 19/136* (2014.01)
(Continued)

(52) U.S. Cl.
CPC ......... *H04N 19/507* (2014.11); *H04N 19/119* (2014.11); *H04N 19/136* (2014.11);
(Continued)

(58) Field of Classification Search
CPC ................................. H04N 19/507
(Continued)

(56) References Cited

U.S. PATENT DOCUMENTS

2003/0227969 A1  12/2003  Wise et al.
2005/0025250 A1*  2/2005  Linzer ............ H04N 19/127
                                              375/240.25
(Continued)

FOREIGN PATENT DOCUMENTS

JP   2000-175199 A   6/2000
JP   2001-223987 A   8/2001
(Continued)

OTHER PUBLICATIONS

Office Action, and English language translation thereof, in corresponding Taiwan Application No. 102116526, dated Mar. 26, 2015, 17 pages.
(Continued)

*Primary Examiner* — Jonathan Messmore
(74) *Attorney, Agent, or Firm* — Brinks Gilson & Lione

(57) ABSTRACT

A video prediction encoding device provided with a picture storage unit storing, as reference pictures to be used for encoding of a subsequent picture, one or more of reconstructed pictures restored from compressed picture data and a memory control unit to control a frame memory in the picture storage unit. When a frame size of input pictures is not more than 1/(2^L) (where L is an integer of one or more) of a maximum frame size of pictures, the memory control unit determines that (2^L) times the maximum number of reconstructed pictures are storable in the frame memory.

11 Claims, 8 Drawing Sheets

(51) Int. Cl.
| | |
|---|---|
| H04N 19/119 | (2014.01) |
| H04N 19/179 | (2014.01) |
| H04N 19/433 | (2014.01) |
| H04N 19/172 | (2014.01) |
| H04N 19/61 | (2014.01) |
| H04N 19/127 | (2014.01) |
| H04N 19/423 | (2014.01) |
| H04N 19/70 | (2014.01) |

(52) U.S. Cl.
CPC ......... *H04N 19/179* (2014.11); *H04N 19/433* (2014.11); *H04N 19/127* (2014.11); *H04N 19/172* (2014.11); *H04N 19/423* (2014.11); *H04N 19/61* (2014.11); *H04N 19/70* (2014.11)

(58) Field of Classification Search
USPC .................................................. 375/240.12
See application file for complete search history.

(56) References Cited

U.S. PATENT DOCUMENTS

| | | | |
|---|---|---|---|
| 2008/0310516 A1 | 12/2008 | Kobayashi et al. | |
| 2014/0023145 A1* | 1/2014 | Rodriguez | H04N 19/59 375/240.25 |
| 2015/0172713 A1* | 6/2015 | Komiya | H04N 19/597 375/240.15 |

FOREIGN PATENT DOCUMENTS

| | | |
|---|---|---|
| JP | 2002-218472 A | 8/2002 |
| JP | 2002-252852 A | 9/2002 |
| JP | 2005-234687 A | 9/2005 |
| TW | 200709692 | 3/2007 |

OTHER PUBLICATIONS

International Preliminary Report on Patentability in corresponding International Application No. PCT/JP2013/062061, dated Jan. 15, 2015, 5 pages.
Fujibayashi A et al, "MaxDpbSize Setting Based on the Picture Size", *101. MPEG Meeting*; Stockholm; (*Motion Picture Expert Group or ISO/IEC JTC1/SC29/WG11*), No. m25536, Jul. 6, 2012, XP030053870, 8 pages.
Extended Search Report in corresponding European Application No. 13812698.2 dated Jan. 12, 2016, 11 pages.
Office Action and partial English language translation therein, in corresponding Japanese Application No. 2012-148310, dated Feb. 23, 2016, 4 pages.
Office Action and English language translation thereof, in corresponding Mexican Application No. MX/a/2014/010046, dated Feb. 5, 2016, 7 pages.
Office Action in corresponding Canadian Application No. 2,878,178, dated Mar. 4, 2016, 5 pages.
Office Action in corresponding Australian Application No. 2013284789, dated Apr. 30, 2016, 3 pages.
Penumutchu, K. et al., "Understanding H.264 Decoder Buffer Mechanism for TMS320DM365", *Texas Instruments Application Report*, Dec. 2009, 10 pages.
Recommendation ITU-T H.264, "Advanced Video Coding for Generic Audiovisual Services", *Telecommunication Standardization Sector of ITU*, Mar. 2009, 670 pages.
Office Action, and English language translation thereof, in corresponding Korean Application No. 10-2015-7002670 dated May 20, 2016, 11 pages.
Office Action, and English language translation thereof, in corresponding Mexican Application No. MX/a/2014/010046 dated Aug. 4, 2016, 7 pages.
Office Action and English language translation thereof, in corresponding Korean Application No. 10-2015-7002670, dated Oct. 17, 2016, 8 pages.
Office Action and English language translation thereof, in corresponding Korean Application No. 10-2016-7019432, dated Oct. 17, 2016, 12 pages.
Office Action and English language translation thereof, in corresponding Korean Application No. 10-2016-7019433, dated Oct. 17, 2016, 11 pages.
Office Action in corresponding European Application No. 13812698.2, dated Nov. 24, 2016.
Office Action, and English language translation thereof, in corresponding Taiwan Application No. 105120992, dated Dec. 26, 2016.
Office Action, and English language translation thereof, in corresponding Chinese Application No. 201380033545.6, dated Jan. 16, 2017, 16 pages.
Office Action, and English language translation thereof, in corresponding Korean Application No. 10-2015-7002670, dated Feb. 17, 2017, 7 pages.
Office Action, and English language translation thereof, in corresponding Korean Application No. 10-2016-7019432, dated Feb. 20, 2017, 9 pages.
Office Action, and English language translation thereof, in corresponding Korean Application No. 10-2016-7019433, dated Feb. 20, 2017, 9 pages.
International Telecommunication Union, "H.264: Advanced video coding for generic audiovisual services," Joint Video Team of ITU-T VCEG and ISO/IEC MPEG, ITU-T Recommendation H.264 and ISO/IEC 14496-10 (MPEG4—Part 10), Series H: Audiovisual and Multimedia Systems, Nov. 2007, A3.1 and A3.2, 6 pages.
International Search Report in corresponding International Application No. PCT/JP2013/062061, dated Aug. 6, 2013, 1 page.
Office Action, and English language translation thereof, in corresponding Korean Application No. 10-2016-7019432, dated Jun. 26, 2017, 8 pages.
Office Action, and English language translation thereof, in corresponding Korean Application No. 10-2016-7019433, dated Jun. 26, 2017, 8 pages.
Office Action in corresponding Australian Application No. 2016210706, dated Jul. 19, 2017, 3 pages.

* cited by examiner

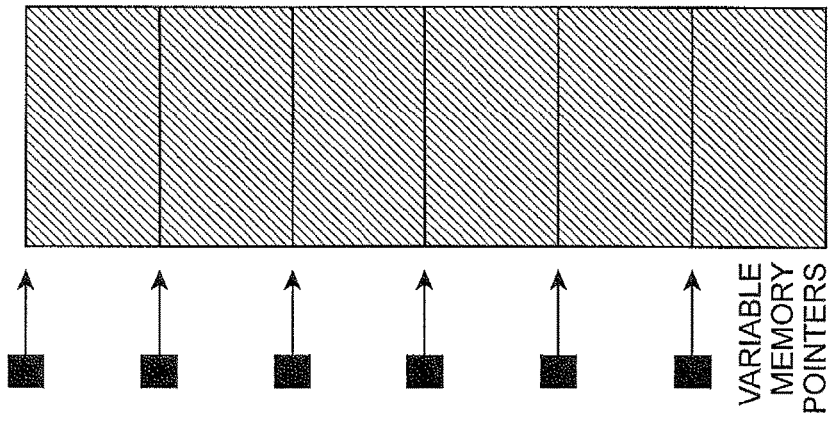
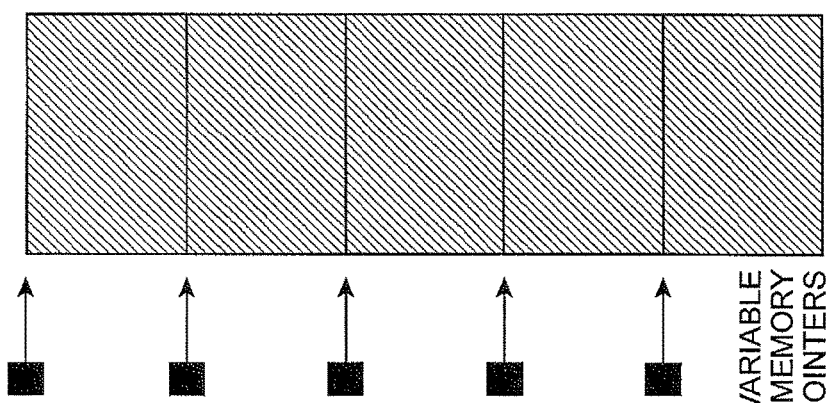
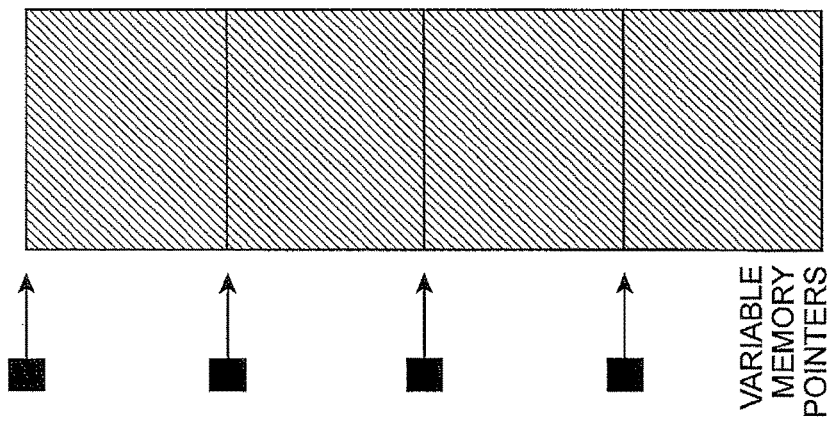

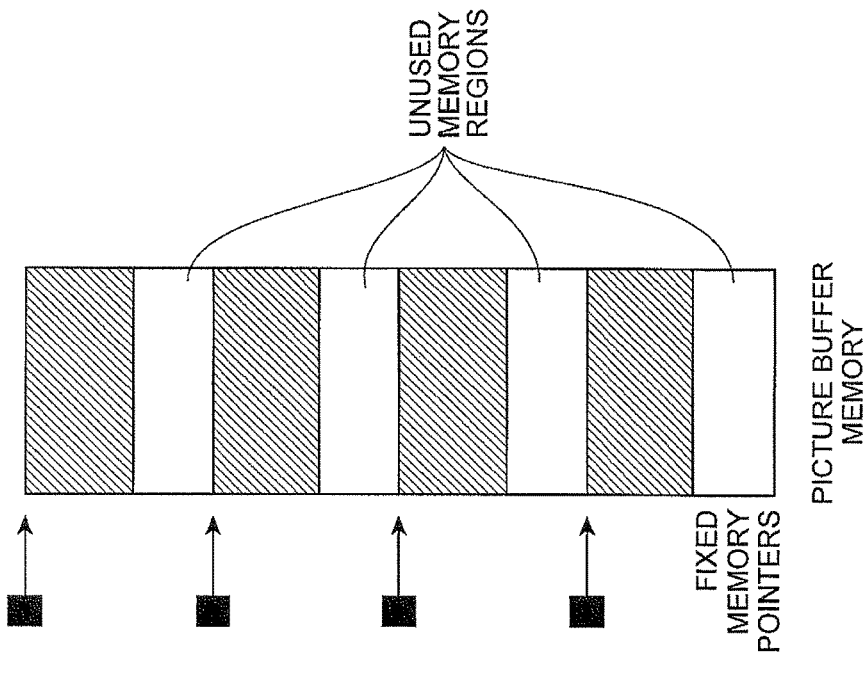
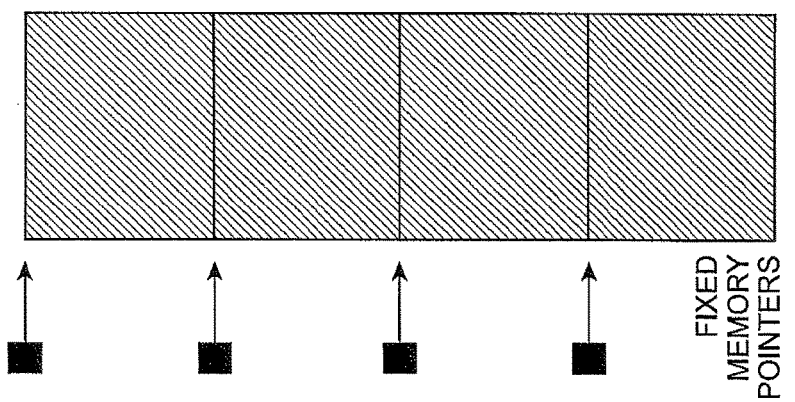

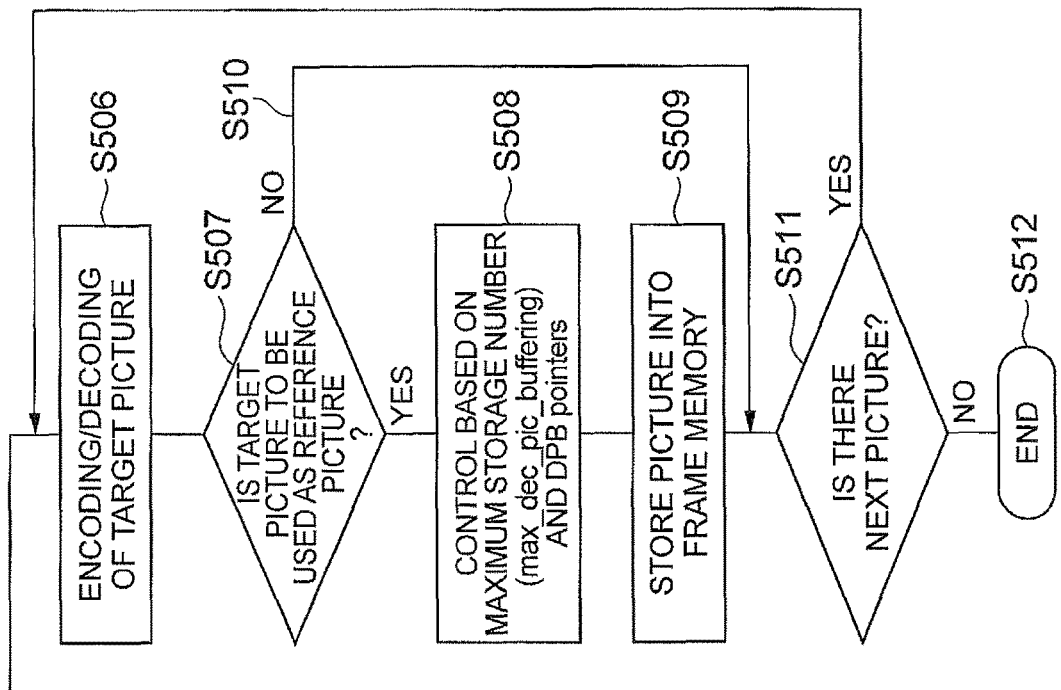
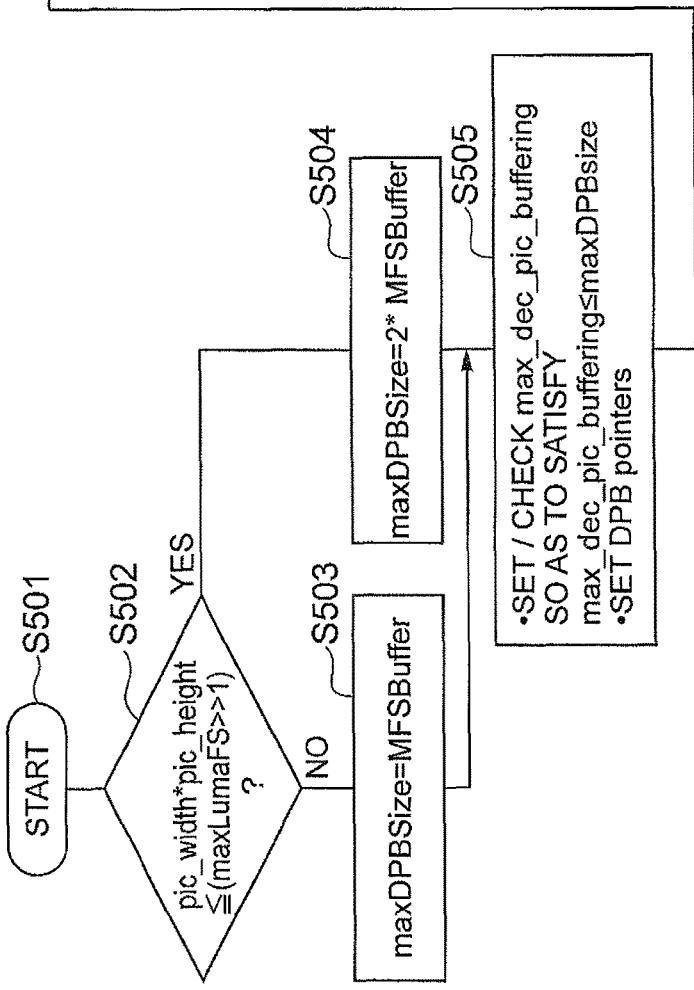
Fig.5

VIDEO PREDICTIVE ENCODING DEVICE, VIDEO PREDICTIVE ENCODING METHOD, VIDEO PREDICTIVE ENCODING PROGRAM, VIDEO PREDICTIVE DECODING DEVICE, VIDEO PREDICTIVE DECODING METHOD, AND VIDEO PREDICTIVE DECODING PROGRAM

RELATED APPLICATIONS

This application is a continuation of PCT/JP2013/062061 filed on Apr. 24, 2013, which claims priority to Japanese Application No. 2012-148310 filed on Jul. 2, 2012. The entire contents of these applications are incorporated herein by reference.

TECHNICAL FIELD

The present invention relates to video predictive encoding and decoding devices, methods, and programs and, more particularly, to devices, methods, and programs to manage the maximum number of reconstructed pictures storable in a decoded picture buffer.

BACKGROUND ART

The video compression technologies are used for efficiently transmitting and storing video data. MPEG1-4 and H.261 to H.264 are widely used video data compression standards.

In these video compression standards, a picture to be encoded is divided into a plurality of blocks, which are encoded and then decoded. In order to increase the coding efficiency, below described prediction coding is used. In intra-frame prediction, a predictive signal is generated using a signal of a reconstructed neighboring picture (a signal restored from a previously compressed picture data) which is present in the frame including the target block. By subtracting the predictive signal from a signal of the target block, a difference between them is obtained and encoded. In inter-frame prediction, a reconstructed picture signal, which is present in a frame different from the frame including a target block, is searched for a displacement of the signal. A predictive signal is generated to compensate the displacement. By subtracting the predictive signal from the signal of the target block, a difference between them is obtained and encoded. The reconstructed picture which is the subject of the motion search and compensation is referred to as a reference picture.

In bidirectional inter-frame prediction, not only is a past picture referenced, but also a future picture is referenced which is ordered for display after the target picture (the future pictures need to be encoded and reconstructed prior to encoding of the target picture). Then, predictive signals acquired from the past picture and the future picture are averaged. This prediction method is effective to predict an object not present in the past but thrown in a future frame and to reduce noise included in the two predictive signals.

Furthermore, in the inter-frame prediction defined in H.264, a plurality of reference pictures which have been encoded and then reconstructed are subjected to motion search, and the predictive signal with the smallest error is selected as an optimum predictive signal for the target block. A difference is calculated between the pixel signal of the target block and the optimum predictive signal and then subjected to a discrete cosine transform, quantization, and entropy encoding. At the same time, information is encoded which identifies the selected reference picture and the region in the selected reference picture from which the optimum predictive signal for the target block is acquired (referred to as a "reference index" and a "motion vector," respectively).

In H.264, a plurality of reconstructed pictures may be referenced. These reconstructed pictures are stored, as reference pictures to be used in prediction, in a decoded picture buffer (DPB), which is a picture buffer memory. The size of the decoded picture buffer (DPB) is defined by a profile and a level, and defined as a bit count, instead of the number of reference pictures. Even with the same profile and level, the number of the storable reference pictures varies according to the frame size of pictures. For example, in the case where the profile is main (Main) and the level is 3.2, the maximum size of the picture buffer (MaxDPBSize: Maximum Decoded Picture Buffer Size) for storage of reference pictures used for prediction is defined as 7680.0×1024 [bytes]. Therefore, the number of reconstructed pictures storable in the decoded picture buffer (DPB) is 5 if the pictures are of 1280×720 and 4:2:0, and the maximum number of reconstructed pictures storable in the decoded picture buffer (DPB) is 4 if the pictures are of 1280×1024 and 4:2:0. FIGS. 1($a$), 1($b$) and 1($c$) show pictures arranged in the decoded picture buffer in which the frame sizes of the pictures determine the maximum number of storable reconstructed pictures, which is 4 (FIG. 1($a$)), 5 (FIG. 1($b$)), or 6 (FIG. 1($c$)). Memory pointers are provided adaptively to the frame size of the reconstructed pictures in the picture buffer memory prepared in advance, whereby an adaptive memory arrangement is achieved in the picture buffer memory.

CITATION LIST

Non Patent Literature

Non Patent Literature 1: "H.264: Advanced video coding for generic audiovisual services," Joint Video Team of ITU-T VCEG and ISO/IEC MPEG, ITU-T Rec. H.264 and ISO/IEC14496-10 (MPEG4-Part 10), November 2007

SUMMARY OF THE INVENTION

Technical Problem

Since the decoding device which complies with the foregoing requirements of H.264 needs to be able to decode pictures of all frame sizes defined by the profiles and levels which fall within the range supported by the decoding device, it is not possible to arrange memories in the picture buffer memory and store reconstructed pictures in these memories in an fixed manner. For this reason, it is necessary to vary, according to the frame size of pictures to be decoded, the memory pointers pointing the positions of memories for storing the reconstructed pictures, resulting in making the memory control and implementation complicated.

A makeshift solution to this problem is adopting a technique in which the maximum number of reconstructed pictures storable in the picture buffer memory (max_dec_pic_buffering) is fixed, regardless of the frame sizes of decoded pictures. Under this solution, since the memory arrangement of the decoded picture buffer (DPB) is fixedly determined by the maximum frame size as shown in FIG. 2($a$), the memory pointers can also be fixed. Namely, the memory control becomes easier compared to the arrangement in which the memory pointers need to be variably controlled. However, when the frame size of decoded pictures is smaller than the maximum frame size or when the vertical width of pictures is half of that of the frame pictures as in the case of interlaced field pictures, implementation of the above solution could generate unused memory regions as shown in FIG. 2(b) and prevent the memory from being effectively used. Furthermore, the solution could deprive a room for improving the coding efficiency which could be realized by storing more reconstructed pictures to increase the number of reference pictures.

It is therefore an object of the present invention to solve the above problem and provide encoding and decoding methods, devices, and programs in which the maximum number of reconstructed pictures storable in the picture buffer memory is determined, according to the frame size of reconstructed pictures, thereby enabling the efficient use of the picture buffer memory and further improvement of the encoding efficiency.

Solution to Problem

In order to achieve the above objects, a video predictive encoding device according to an embodiment of the present invention comprises input means that inputs a plurality of pictures forming a video sequence and encoding means that compresses the pictures, using either intra-frame prediction or inter-frame prediction, to generate compressed picture data including information about a target picture frame size, the maximum number of storable reconstructed pictures, and the maximum frame size specified as an encoding constraint, and encodes the compressed picture data along with encoding specification data regarding the information on the target picture frame size, the maximum number of storable reconstructed pictures, and the maximum frame size. The video predictive encoding device further comprises decoding means that decodes the compressed picture data to reconstruct the pictures, picture storage means that stores one or more of the reconstructed pictures as reference pictures to be used for encoding a subsequent picture, and memory control means that controls a picture buffer memory in the picture storage means, wherein when the frame size of the input pictures is not more than $1/(2^L)$ (where L is an integer of one or more) of the maximum frame size of pictures, the memory control means determines that $(2^L)$ times the maximum number of reconstructed pictures are storable in the frame memory.

In this video predictive encoding device, the maximum number of reconstructed pictures storable in the picture buffer memory is determined, based on the relationship between the frame size associated with respective pictures forming the video sequence or the compressed picture data and the maximum frame size specified as an encoding constraint. More specifically, for example, when the frame size of the input pictures is larger than $1/(2^L)$ (where L is an integer of one or more) of the maximum frame size specified as an encoding constraint, the maximum number of storable reconstructed pictures is set to N (where N is an integer of one or more), whereas when the frame size of the input pictures is not more than $1/(2^L)$ of the maximum frame size, the memory buffer amount available for storing reconstructed pictures is controlled to allow storage of up to the $((2^L) \times N)$ number of reconstructed pictures. In this configuration, when the frame size of reconstructed pictures is not more than $1/(2^L)$ of the maximum frame size specified as an encoding constraint, the maximum number of storable reconstructed pictures can be increased, and thus the number of storable reference pictures can also be increased to thereby improve the coding efficiency.

In a video predictive encoding device according to another embodiment of the present invention, the memory control means fixes memory pointers pointing storage positions of reconstructed pictures in the memory when determining the maximum number of reconstructed pictures storable in the frame memory.

In this video predictive encoding device, the memory pointers pointing the storage positions of the respective reconstructed pictures can be fixed, for example, at positions equal to the maximum frame size and $1/(2^L)$ thereof. Therefore, control is not needed to vary the memory pointers depending upon the frame sizes, and simpler implementation of more efficient memory control can be realized. Since pointer intervals are limited to multiples of $1/(2^L)$, the positions of the memory pointers may be calculated with a shift operation, and thus the calculation cost can be reduced.

A video predictive decoding device according to an embodiment of the present invention comprises input means that inputs encoded data comprising compressed picture data which includes information on a target picture frame size, a maximum number of storable reconstructed pictures, and a maximum frame size specified as an encoding constraint, wherein a plurality of pictures constituting a video sequence has been compressed by either intra-frame prediction or inter-frame prediction. The video predictive decoding device further comprises decoding means that decodes the compressed picture data and the compressed picture data constituting the information on the target picture frame size, the maximum number of storable reconstructed pictures, and the maximum frame size to reconstruct pictures and the information on the target picture frame size, the maximum number of storable reconstructed pictures, and the maximum frame size. The device further comprises picture storage means that stores one or more of the reconstructed pictures as reference pictures to be used for decoding a subsequent picture and memory control means that controls the picture storage means, wherein when a frame size of the input pictures is not more than $1/(2^L)$ (where L is an integer of one or more) of the maximum frame size of pictures, the memory control means determines that $(2^L)$ times the maximum number of reconstructed pictures are storable in a frame memory.

In this video predictive decoding device, the maximum number of reconstructed pictures storable in the picture buffer memory is determined based on the relationship between the frame size associated with respective pictures forming the video sequence or the compressed picture data and the maximum frame size specified as an encoding constraint. More specifically, for example, when the frame size of the input pictures is larger than $1/(2^L)$ (where L is an integer of one or more) of the maximum frame size specified as an encoding constraint, the maximum number of storable reconstructed pictures is set to N (where N is an integer of one or more), whereas when the frame size of the input pictures is not more than $1/(2^L)$ of the maximum frame size, it is determined that up to the $(2^L) \times N$ number of reconstructed pictures are storable. In this configuration, when the frame size of reconstructed pictures is not more than $1/(2^L)$ of the maximum frame size specified as an encoding setting, the maximum number of storable reconstructed pictures can be increased, and thus the number of storable reference pictures can also be increased to thereby improve the coding efficiency.

In a video predictive decoding device according to another embodiment of the present invention, the memory control means fixes the memory pointers pointing storage positions of reconstructed pictures in the frame memory, when determining the maximum number of reconstructed pictures storable in the frame memory.

In this video predictive decoding device, the memory pointers pointing the storage positions of the reconstructed pictures can be fixed, for example, at positions equal to the maximum frame size and $1/(2^L)$ thereof. Therefore, control is not needed to vary the memory pointers depending upon the frame sizes, and simpler implementation of more efficient memory control can be realized. Since pointer intervals are limited to multiples of $1/(2^L)$, the positions of the memory pointers can be calculated with a shift operation, and therefore the operation cost can be reduced.

A video prediction encoding method according to an embodiment of the present invention is executed by a video predictive encoding device. The method comprises an input step of inputting a plurality of pictures forming a video sequence, and an encoding step of encoding the pictures by either intra-frame prediction or inter-frame prediction to generate compressed picture data including information on a target picture frame size, a maximum number of storable reconstructed pictures, and a maximum frame size specified as an encoding constraint, wherein the compressed picture data is compressed along with encoding specification data regarding the information on the target picture frame size, the maximum number of storable reconstructed pictures, and the maximum frame size. The method further comprises a decoding step of decoding the compressed picture data to reconstruct the pictures, a picture storage step of storing one or more of the reconstructed pictures as reference pictures to be used for encoding a subsequent picture, and a memory control step of controlling a picture buffer memory in the picture storage step, wherein when the frame size of the input pictures is not more than $1/(2^L)$ (where L is an integer of one or more) of the maximum frame size of pictures, the memory control step determines that $(2^L)$ times the maximum number of reconstructed pictures are storable in the frame memory.

A video predictive encoding program according to an embodiment of the present invention comprises an input module that inputs a plurality of pictures forming a video sequence and an encoding module that encodes the pictures by either intra-frame prediction or inter-frame prediction to generate compressed picture data including information on a target picture frame size, a maximum number of storable reconstructed pictures, and a maximum frame size specified as an encoding constraint and encodes the compressed picture data along with encoding specification data regarding the information on the target picture frame size, the maximum number of storable reconstructed pictures, and the maximum frame size. The program further comprises a decoding module that decodes the compressed picture data to reconstruct pictures, a picture storage module that stores one or more of the reconstructed pictures as reference pictures to be used for encoding a subsequent picture, and a memory control module that controls a picture buffer memory in the picture storage module, wherein when the frame size of the input pictures is not more than $1/(2^L)$ (where L is an integer of one or more) of the maximum frame size of pictures, the memory control module determines that $(2^L)$ times the maximum number of reconstructed pictures are storable in the frame memory.

The video predictive encoding method and the video predictive encoding program can achieve the same effects as the aforementioned video predictive encoding device.

A video predictive decoding method according to an embodiment of the present invention is executed by a video predictive decoding device. The method comprises an input step of inputting encoded data comprising compressed picture data which includes a target picture frame size, a maximum number of storable reconstructed pictures, and a maximum frame size specified as an encoding constraint, wherein a plurality of pictures constituting a video sequence is compressed by either intra-frame prediction or inter-frame prediction. The method further comprises a decoding step of decoding the compressed picture data and the compressed picture data constituting the information on the target picture frame size, the maximum number of storable reconstructed pictures, and the maximum frame size to construct pictures and the information on the target picture frame size, the maximum number of storable reconstructed pictures, and the maximum frame size. The method further comprises a picture storage step of storing, in picture storage means, one or more of the reconstructed pictures as reference pictures to be used for decoding a subsequent picture and a memory control step of controlling the picture storage means, wherein when the frame size of the input pictures is not more than $1/(2^L)$ (where L is an integer of one or more) of the maximum frame size of pictures, the memory control step determines that $(2^L)$ times the maximum number of reconstructed pictures are storable in a frame memory.

A video predictive decoding program according to an embodiment of the present invention comprises an input module that inputs encoded data comprising compressed picture data which includes a target picture frame size, a maximum number of storable reconstructed pictures, and a maximum frame size specified as an encoding constraint, wherein a plurality of pictures constituting a video sequence is compressed either intra-frame prediction or inter-frame prediction. The program further comprises a decoding module that decodes the compressed picture data and that compressed picture data constituting the information on the target picture frame size, the maximum number of storable reconstructed pictures, and the maximum frame size to reconstruct pictures and the information on the target picture frame size, the maximum number of storable reconstructed pictures, and the maximum frame size. The program further comprises a picture storage module that stores one or more of the reconstructed pictures as reference pictures to be used for decoding a subsequent picture and a memory control module that controls the picture storage module, wherein when the frame size of the input pictures is not more than $1/(2^L)$ (where L is an integer of one or more) of the maximum frame size of pictures, the memory control module determines that $(2^L)$ times the maximum number of reconstructed pictures are storable in a frame memory.

The video prediction decoding method and the video prediction decoding program can achieve the same effects as the aforementioned video prediction decoding device can achieve.

Effects of the Invention

The video predictive encoding and decoding devices, methods, and programs according to the present invention perform determining the maximum number of reconstructed pictures storable in the picture buffer memory, according to the frame size of the reconstructed pictures, thereby achieving the efficient use of the picture buffer memory and also improving the encoding efficiency.

BRIEF DESCRIPTION OF THE DRAWINGS

FIGS. 1(*a*) through 1(*c*) are drawings showing picture buffer memories, the number of storable pictures, and positions of variable memory pointers.

FIGS. 2(a) and 2(b) are drawings for explaining a problem of fixed memory pointers in the picture buffer memory.

FIG. 5 is a flowchart showing first video predictive encoding and decoding methods according to an embodiment of the present invention.

DETAILED DESCRIPTION OF THE PREFERRED EMBODIMENTS

Embodiments of the present invention will be described below using FIGS. 3 to 8.

Figure 3:
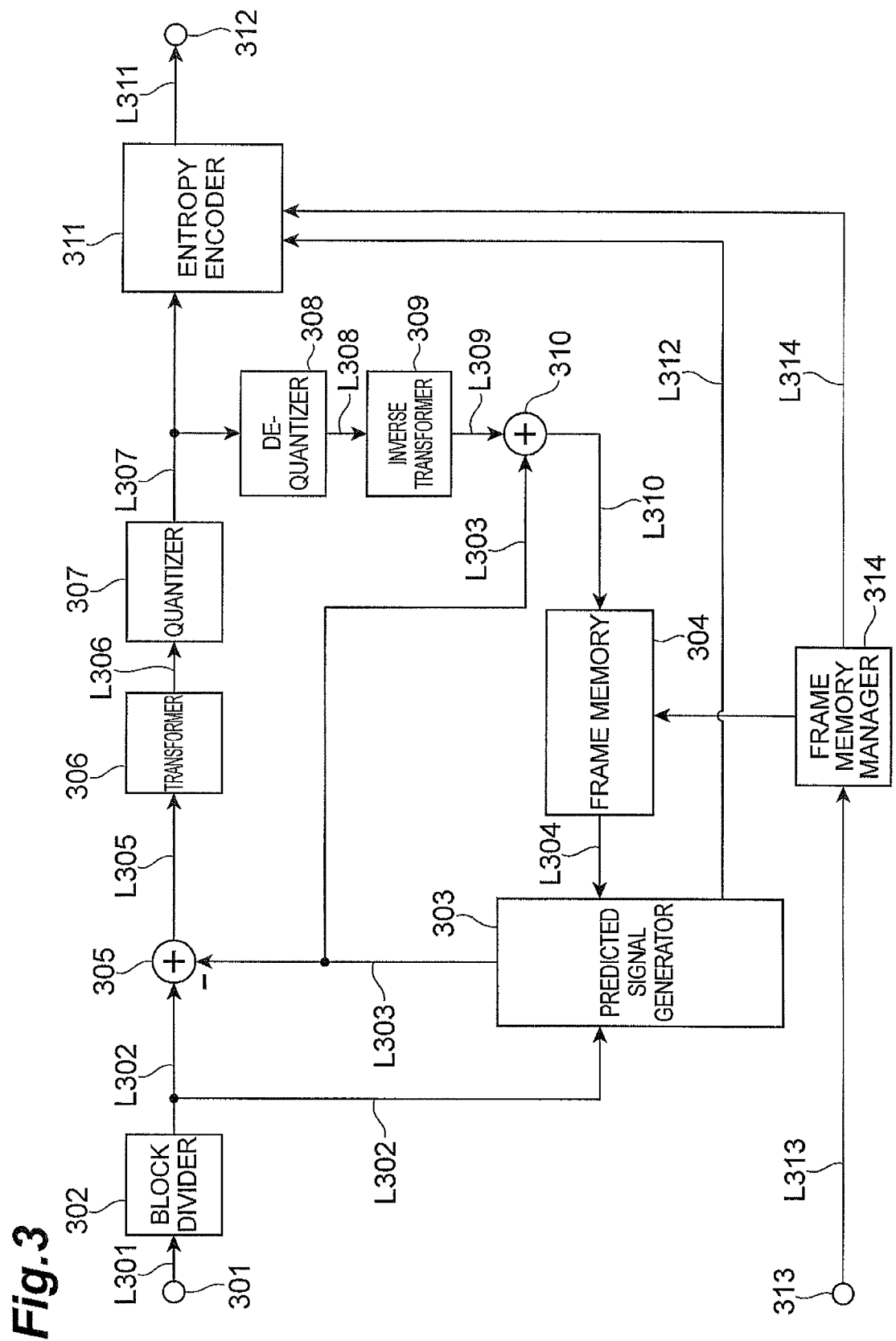
FIG. 3 is a block diagram showing a video predictive encoding device according to an embodiment of the present invention.

FIG. 3 is a block diagram showing a video predictive encoding device according to an embodiment of the present invention. Reference numeral 301 denotes an input terminal, 302 denotes a block division unit, 303 denotes a predictive signal generation unit, 304 denotes a frame memory, 305 denotes a subtraction unit, 306 denotes a transform unit, 307 denotes a quantization unit, 308 denotes a de-quantization unit, 309 denotes an inverse transform unit, 310 denotes an addition unit, 311 denotes an entropy encoding unit, 312 denotes an output terminal, and 314 denotes a frame memory management unit (or buffer management unit). The input terminal 301 constitutes input means. The predictive signal generation unit 303, subtraction unit 305, transform unit 306, quantization unit 307, and entropy encoding unit 311 constitute encoding means. The de-quantization unit 308, inverse transform unit 309, and addition unit 310 constitute decoding means. The frame memory 304 constitutes picture storage means. The frame memory management unit 314 constitutes memory control means.

The operation of the video predictive encoding device configured as described above will be described below. A video signal representing a plurality of pictures is fed to the input terminal 301. A picture to be encoded (a "target picture") is divided into a plurality of regions by the block division unit 302. In the embodiment according to the present invention, the target picture is divided into blocks each having 8×8 pixels, but it may be divided into blocks of any size or shape other than the foregoing. A predictive signal is then generated for a region to be encoded (referred hereinafter to as a target block). The embodiment according to the present invention employs two types of prediction methods. Namely, they are inter-frame prediction and intra-frame prediction.

In the inter-frame prediction, reconstructed pictures that have been encoded and thereafter restored are used as reference pictures, and the motion information that provides the predictive signal with the smallest error from the target block is determined from the reference pictures. This process is called motion detection. Depending upon situations, it is also allowable to subdivide the target block into sub-regions and perform inter-frame prediction on each of the sub-regions. In this process, the division method which gives rise to the most efficient result given the target block as a whole is selected from various division methods, and motion information of each sub-region is determined. In the embodiment according to the present invention, this operation is carried out in the predictive signal generation unit 303, to which the target block is fed via line L302, and reference pictures are fed via L304. The reference pictures to be used herein are a plurality of pictures which have been encoded and restored. The details of this operation are the same as the conventional technologies adopted in MPEG-2 or 4 and H.264. The motion information and the sub-region division method determined as described above are fed via line L312 to the entropy encoding unit 311, encoded thereby and then output from the output terminal 312. Information (a reference index) identifying the reference picture among a plurality of reference pictures from which the predictive signal is generated is also sent via line L312 to the entropy encoding unit 311. In the embodiment according to the present invention, M reconstructed pictures (M is an integer of one or more) are stored in the frame memory 304 and are to be used as reference pictures. The predictive signal generation unit 303 acquires reference picture signals from the frame memory 304 and generates a predictive signal, based on the dividing method for defining sub-regions and the reference picture and the motion information for each sub-region. The inter-frame predictive signal generated in this manner is fed via line L303 to the subtraction unit 305.

In the intra-frame prediction, an intra-frame predictive signal is generated using the values of previously reconstructed pixels spatially adjacent to the target block. Specifically, the predictive signal generation unit 303 acquires previously reconstructed pixel signals in the same frame from the frame memory 304 and extrapolates these signals to generate the intra-frame predictive signal. The information on the method of extrapolation is fed via line L312 to the entropy encoding unit 311, encoded thereby and output from the output terminal 312. The intra-frame predictive signal generated in this manner is fed to the subtraction unit 305. The method of generating the intra-frame predictive signal in the predictive signal generation unit 303 is a conventional technology adopted in H.264. One of the inter-frame predictive signal and the intra-frame predictive signal obtained as described above, which produces a smaller error, is selected, and the selected predictive signal is fed to the subtraction unit 305.

Since there are no pictures present prior to the first picture, all target blocks thereof are processed by intra-frame prediction.

The subtraction unit 305 subtracts the predictive signal (fed via line L303) from the signal of the target block (fed via line L302) to generate a residual signal. This residual signal is subjected to a discrete cosine transform by the transform unit 306, and then resulting transform coefficients are quantized by the quantization unit 307. Finally, the entropy encoding unit 311 encodes the quantized transform coefficients, and the encoded data is output from the output terminal 312, along with the information on the prediction method.

In order to perform the intra-frame prediction or the inter-frame prediction on a subsequent target block, the compressed signal of the target block is inversely processed and restored. Namely, the quantized transform coefficients are inversely quantized by the de-quantization unit 308 and then subjected to an inverse discrete cosine transform by the inverse transform unit 309 to restore the residual signal. The addition unit 310 adds the restored residual signal to the predictive signal fed via line L303 to reconstruct a signal of the target block, which is stored in the frame memory 304. Although the present embodiment employs the transform unit 306 and the inverse transform unit 309, it is also possible to use other types of transform processing instead of these transform units. Depending upon situations, the transform unit 306 and the inverse transform unit 309 may be omitted.

The frame memory 304 is a finite storage and impossible to store all reconstructed pictures. Only the reconstructed pictures to be used for encoding subsequent picture are stored in the frame memory 304. The frame memory management unit 314 is the one that controls this frame memory 304. The frame memory management unit 314 controls the frame memory 304 so as to delete the oldest picture among the M reconstructed pictures (M is an integer of one or more) stored in the frame memory 304 such that the latest reconstructed picture can be stored as a reference picture. Through an input terminal 313, the frame size of each picture and the maximum frame size specified as an encoding constraint (profile and level) are fed, based on which the maximum number of reconstructed pictures storable in the frame memory is determined, and the frame memory management unit 314 operates to store reconstructed pictures within the maximum number. At the same time, the information on the frame size of each picture, the maximum frame size specified as an encoding constraint, and the maximum number of reconstructed pictures storable in the frame memory is fed via line L314 to the entropy encoding unit 311, encoded thereby, and output along with the compressed picture data. The frame size, the maximum frame size specified as an encoding constraint, and the maximum number of reconstructed pictures storable in the frame memory are associated with each picture. The frame size may be expressed by a raw frame size value or may be expressed in the form of an exponent or a power. If the maximum frame size is specified in advance as profile and level information, the maximum frame size may be input using the information. It should be noted that in the present embodiment, the value of the frame size is directly converted into binary data, and the maximum frame size is specified as level information. It will be described later how the frame memory management unit 314 is controlled.

Figure 4:
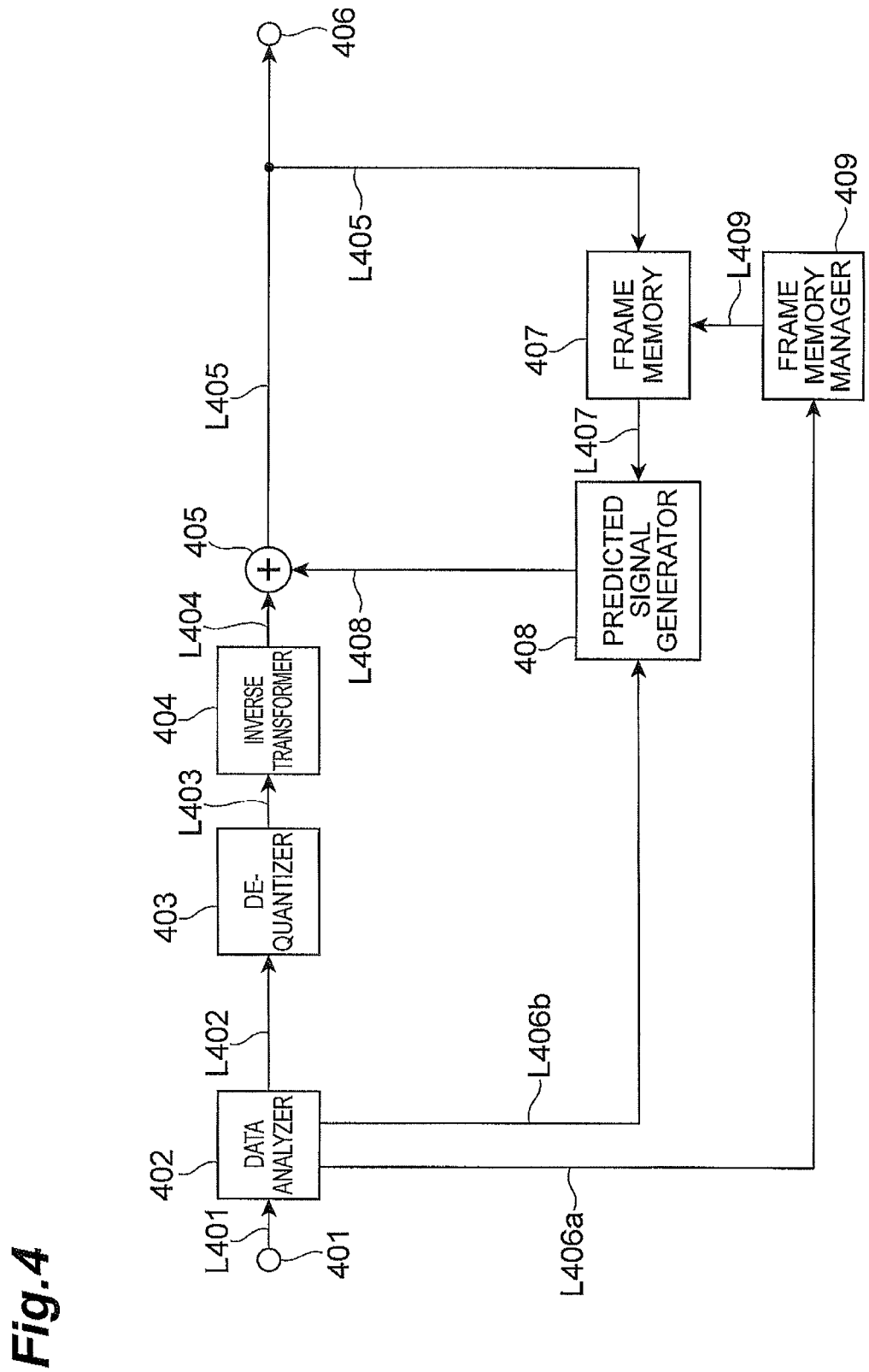
FIG. 4 is a block diagram showing a video predictive decoding device according to an embodiment of the present invention.

Next, the video predictive decoding method will be described. FIG. 4 is a block diagram showing a video predictive decoding device according to an embodiment of the present invention. Reference numeral 401 denotes an input terminal, 402 denotes a data analysis unit, 403 denotes a de-quantization unit, 404 denotes an inverse transform unit, 405 denotes an addition unit, 408 denotes a predictive signal generation unit, 407 denotes a frame memory, 406 denotes an output terminal, and 409 denotes a frame memory management unit. The input terminal 401 constitutes input means. The de-quantization unit 403 and inverse transform unit 404 constitute decoding means. Other types of decoding means may be employed instead of the foregoing. The frame memory 407 constitutes picture storage means. The frame memory management unit 409 constitutes memory control means. Furthermore, the decoding means may be configured without the inverse transform unit 404.

The operation of the video predictive decoding device configured as described above will be described below. Compressed data encoded as described above is input through the input terminal 401. The compressed data contains a residual signal resulting from the predictive encoding of each target block obtained by dividing a picture into a plurality of blocks, and the information on generation of a predictive signal. The information on generation of the predictive signal includes information on block division (size of block), motion information, and the aforementioned reference index when the inter-frame prediction was performed, or includes information on an extrapolation method performed on reconstructed surrounding pixels when the intra-frame prediction was performed.

The data analysis unit 402 extracts, from the compressed data, the residual signal of the target block, the information on generation of the predictive signal, a quantization parameter, the frame size of pictures, the maximum frame size specified as an encoding constraint, and the maximum number of reconstructed pictures storable in the frame memory. The residual signal of the target block is inversely quantized with the quantization parameter (fed via line L402) by the de-quantization unit 403. The result is subjected to an inverse discrete cosine transform by the inverse transform unit 404.

Next, the information on generation of the predictive signal is fed via line L406b to the predictive signal generation unit 408. The predictive signal generation unit 408 accesses the frame memory 407, based on the information on generation of the predictive signal, to acquire a reference signal from a plurality of reference pictures in order to generate a predictive signal. This predictive signal is fed via line L408 to the addition unit 405. The addition unit 405 adds the predictive signal to the restored residual signal to reconstruct a target block signal, which is output via line L405 and simultaneously stored into the frame memory 407.

Reconstructed pictures to be used for decoding and reconstruction of a subsequent picture are stored in the frame memory 407. The frame memory management unit 409 controls the frame memory 407. The frame memory 407 is controlled so as to delete the oldest one among the stored M reconstructed pictures (M is an integer) such that the latest reconstructed picture used as a reference picture can be stored. The information on the frame size of the target picture, the maximum frame size specified as an encoding constraint, and the maximum number of reconstructed pictures storable in the frame memory are fed via line L406a to the frame memory management unit 409, based on which the frame memory management unit 409 operates. It will be described later how the frame memory management unit 409 is controlled.

The operations of the video predictive encoding method and the video predictive decoding method will be described below using FIGS. 5 and 6. FIG. 5 is a flowchart showing the video predictive encoding and decoding methods according to an embodiment of the present invention. The variables noted in the same drawing will be explained. pic_width is a variable indicative of a luminance pixel count of a lateral width of the reconstructed pictures, pic_height is a variable indicative of a luminance pixel count of a vertical width of the reconstructed pictures, MaxLumaFS is a variable indicative of a maximum picture size defined by level information, MFSBuffer is a variable indicative of a memory buffer amount expressed by the maximum number of reconstructed pictures storable in the decoded picture buffer (DPB), which is defined as level information, maxDPBsize is a variable indicative of a memory buffer amount expressed by the maximum number of reconstructed pictures storable in the decoded picture buffer (DPB), max_dec_pic_buffering is a variable indicative of a maximum storage number (memory buffer amount) of reconstructed pictures used in decoding, and DPBpointer is a variable indicative of a pointer indicating a position of storage of a reconstructed picture in the decoded picture buffer.

In FIG. 5, input are the pic_width indicative of the luminance pixel count of the lateral width of the reconstructed pictures, the pic_height indicative of the luminance pixel count of the vertical width of the reconstructed pictures, the MaxLumaFS indicative of the maximum frame size specified as an encoding constraint, and the MFSBuffer indicative of the memory buffer amount expressed by the maximum number of reconstructed pictures storable in the decoded picture buffer (DPB). Next, a product of the pic_width indicative of the luminance pixel count of the lateral width of the reconstructed pictures and the pic_height indicative of the luminance pixel count of the vertical width of the reconstructed pictures in the input data is compared with a half (MaxLumaFS/2) of the MaxLumaFS indicative of the maximum picture size specified as an encoding constraint (step S502). If the condition is not met (or if the product of pic_width and pic_height is larger than the MaxLumaFS/2), maxDPBsize=MFSBuffer is set (step S503). If the condition is met (or if the product of pic_width and pic_height is not more than the MaxLumaFS/2), maxDPBsize=2*MFSBuffer is set (step S504).

(Operations)

$$\text{maxDPBsize}=2*\text{MFSBuffer (if pic\_width*pic\_height} \le (\text{MaxLumaFS}>>1))$$

$$\text{maxDPBsize}=\text{MFSBuffer (otherwise)}$$

In the above operation ">>" represents a right shift operation and has the same meaning as MaxLumaFS/2.

Then, the memory buffer amount (max_dec_pic_buffering) expressed by the maximum storage number of reconstructed pictures used in decoding is set to not more than maxDPBsize.

(Operation)

$$\text{max\_dec\_pic\_buffering} \le \text{maxDPBsize}$$

Figure 6A:
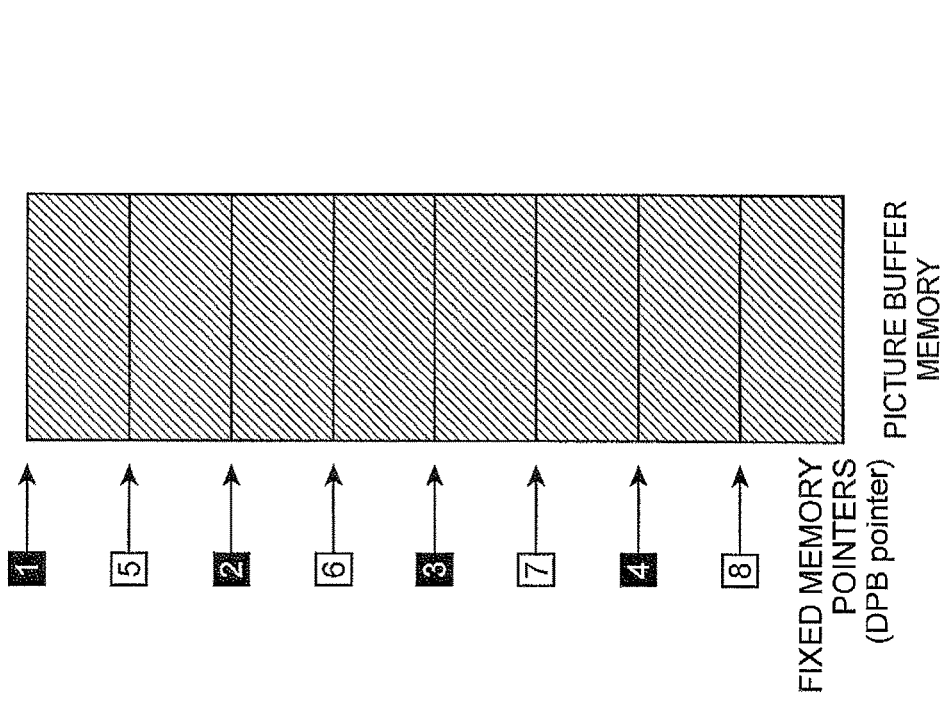
FIGS. 6(a) and 6(b) are schematic drawings for explaining processing of the first video predictive encoding and decoding methods according to the embodiment of the present invention.

If maxDPBsize=MFSBuffer, as shown in FIG. 6(a), DPBpointer=1 is set to the head of the picture memory buffer, and DPBpointer=2, 3, and 4 are set, respectively, to the positions distant from the position of DPBpointer=1 by two times, three times and four times the maximum frame size.

Figure 6B:
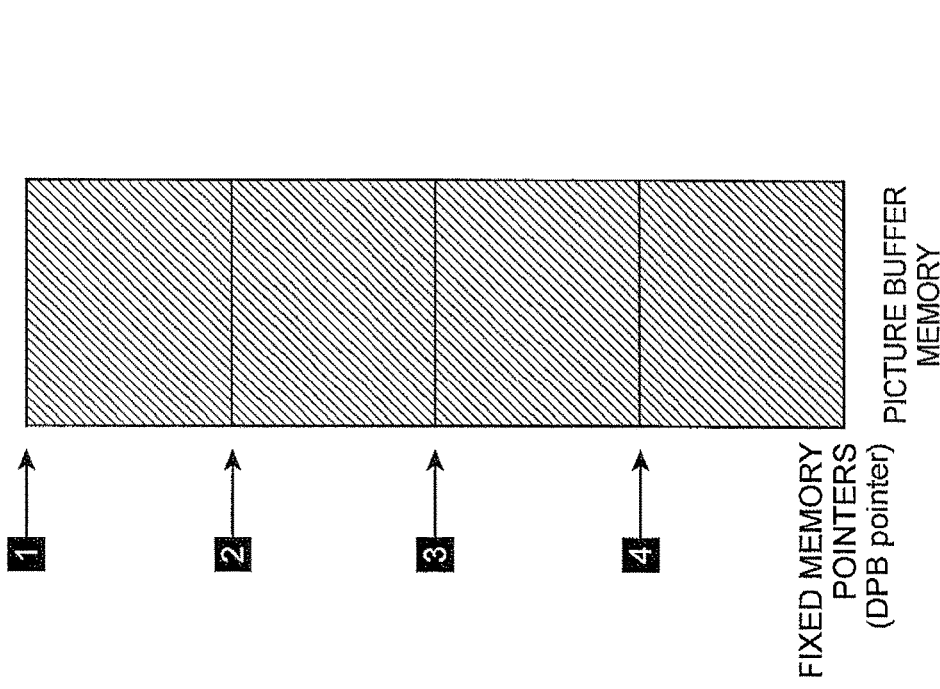

If maxDPBsize=2*MFSBuffer, as shown in FIG. 6(b), in addition to the DPB pointers 1 to 4 already set, further DPB pointers are set, respectively, to the positions distant from the position of DPBpointer=1 by 1/2 times, 3/2 times, 5/2 times, and 7/2 times the maximum frame size from (step S505).

The max_dec_pic_buffering and DPB pointers so set are used in the control operation of the frame memory in step S508 as described below. Namely, during decoding, reconstructed pictures are stored in the frame memory up to the maximum number of max_dec_pic_buffering, and when being stored, the reconstructed pictures are controlled to be stored based on the DPB pointers as set above. In encoding, information is given from the outside which includes information on the pic_width indicative of the luminance pixel count of the lateral width of the reconstructed pictures and the pic_height indicative of the luminance pixel count of the vertical width of the reconstructed pictures and level information on the MaxLumaFS indicative of the maximum picture size and the MFSBuffer indicative of the memory buffer amount expressed by the maximum number of reconstructed pictures storable in the decoded picture buffer (DPB). In FIG. 3, the information is fed via the input terminal 313 from a control device not shown.

On the other hand, in step S506, a target picture is encoded and then decoded by the method described with FIG. 3. The encoded picture data is output to the outside or stored. It is determined in step S507 whether the target picture is to be used as a reference picture in the subsequent processing. The determination in S507 depends on how the picture is encoded (intra-frame prediction encoding, inter-frame prediction encoding, or bidirectional prediction encoding). When the target picture is not used as a reference picture, the flow goes to step S510. When the target picture is used as a reference picture, the flow goes to step S508, where the DPB pointers are set to the positions shown in FIG. 6(a) or 6(b). Then, the decoded and reconstructed picture is stored in the frame memory in step S509, and the flow goes to step S511. If there is a next picture in step S511, the flow goes to S506, whereas if there is no next picture the process is terminated. The encoding process is executed through the last picture in this manner.

The above-described processes are performed in the entire video encoding device shown in FIG. 3. Specifically, the steps S502, S503, S504, S505, and S508 are carried out in the frame memory management unit 314.

The process shown in FIG. 5 was described above as a video encoding method, but it is applicable to the processing of a video decoding method. When decoding is performed, in step S501, compressed and encoded picture data (bit stream) is input. Extracted from the input data are the pic_width indicative of the luminance pixel count of the lateral width of the reconstructed pictures, the pic_height indicative of the luminance pixel count of the vertical width of the reconstructed pictures, the MaxLumaFS indicative of the maximum frame size specified as an encoding constraint, the MFSBuffer indicative of the memory buffer amount expressed by the maximum number of reconstructed pictures storable in the decoded picture buffer (DPB), and the max_dec_pic_buffering indicative of the maximum storage number (memory buffer amount) of reconstructed pictures used in decoding, and the steps S502-S505 and S508 are carried as described above. On the decoding side, it is checked in step S505 whether the restored max_dec_pic_buffering is not more than the maxDPBsize. In Step S506, the compressed data of the target picture is decoded to restore the picture. Step S507 and the subsequent steps are performed as described above. These processes are performed in the video decoding device shown in FIG. 4. Specifically, steps S502, S503, S504, S505, and S508 are carried out in the frame memory management unit 409 of the video decoding device.

FIGS. 6(a) and 6(b) are schematic diagrams for explaining the positions of the memory pointers in the frame memory implemented in the video predictive encoding and decoding methods according to the embodiment of the present invention. A comparison between FIGS. 6(a) and 6(b) reveals that the positions of the memory pointers 1 to 4 are fixed. When the condition in step S503 is met, the new memory pointers 5 to 8 are added. Namely, regardless of the determination result in step S503, the positions of the memory pointers are fixed.

(Positions of Memory Pointers)

In the present embodiment, the memory pointer 1 to 4 and 5 to 8 are alternately set, but the memory pointers may be assigned numbers incremental from 1 to 8.

(Number of Memory Divisions)

In the present embodiment, the pic_width indicative of the luminance pixel count of the lateral width of the reconstructed pictures and the pic_height indicative of the luminance pixel count of the vertical width of the reconstructed pictures are compared with a half (MaxLumaFS/2) of the MaxLumaFS indicative of the maximum frame size specified as an encoding constraint. It should however be noted that the pic_width indicative of the luminance pixel count of the lateral width of the reconstructed pictures and the pic_height indicative of the luminance pixel count of the vertical width of the reconstructed pictures may be compared with the maximum frame size MaxLumaFS/(2^L) (where L is an integer of 2 or more) specified as an encoding constraint. When so compared, the positions of the memory pointers pointing the storage positions of reconstructed pictures may be set so that the memory pointers are arranged at positions determined by 1/(2^L) of MaxLumaFS while the pointers already arranged are fixed, as shown in FIGS. 6(a) and 6(b).

(Definition of Frame Size)

In the present embodiment, the frame size is expressed by the pic_width indicative of the luminance pixel count of the lateral width of the reconstructed pictures and the pic_height indicative of the luminance pixel count of the vertical width of the reconstructed pictures. It should however be noted that it is also possible to use a value indicative of the already multiplied value which represents a frame size. The frame size may also be calculated by a method other than the above.

In the present embodiment, the MaxLumaFS indicative of the maximum picture size and the MFSBuffer indicative of the memory buffer amount expressed by the maximum number of reconstructed pictures having the size of MaxLumaFS storable in the decoded picture buffer (DPB) are specified as level information. It should however be noted that they need not be transmitted as the level information. They may be added as information other than the level information.

In the present embodiment, FSBuffer and maxDPBsize are expressed by the maximum number of storable reconstructed pictures. It should however be noted that they may be expressed as the actual memory amount. If so expressed, the number of reconstructed pictures is calculated by dividing the memory amount with the frame size.

Since the maximum number of reconstructed pictures storable in the picture buffer memory is determined, based on the relationship between the picture frame size and the maximum frame size specified as an encoding constraint, when the actual frame size is smaller than the maximum frame size, a waste of the frame memory can be reduced, and memory regions for storing reference pictures can be increased to thereby enable further improvement of the coding efficiency.

A video predictive encoding program and a video predictive decoding program for a computer to function as the foregoing video predictive encoding device and video predictive decoding device may be provided as programs stored in a recording medium. Examples of such recording media include recording media such as floppy (registered trademark) disks, CD-ROMs, DVDs, and ROMs, semiconductor memories, and the like.

Specifically, the video predictive encoding program is provided with an input module that implements input of a plurality of pictures constituting a video sequence, an encoding module that encodes the pictures by either intra-frame prediction or inter-frame prediction to generate compressed picture data including information on the target picture frame size, a maximum number of storable reconstructed pictures, and a maximum frame size as an encoding setting, and to encode the compressed picture data along with encoding specification data regarding the information on the target picture frame size, the maximum number of storable reconstructed pictures, and the maximum frame size, a decoding module that decodes the compressed picture data to reconstruct pictures, a picture storage module that stores one or more of the reconstructed pictures as reference pictures to be used for encoding a subsequent picture, and a memory control module that controls a picture buffer memory in the picture storage module, wherein when a frame size of the input pictures is not more than 1/(2^L) (where L is an integer of one or more) of the maximum frame size of pictures, the memory control module determines that (2^L) times the maximum number of reconstructed pictures are storable in the frame memory.

The video predictive decoding program is provided with an input module that implements input of encoded data comprising compressed picture data which includes information on the target picture frame size, a maximum number of storable reconstructed pictures, and a maximum frame size as an encoding setting, wherein a plurality of pictures constituting a video sequence are encoded by either intra-frame prediction or inter-frame prediction, a decoding module that decodes the compressed picture data and the compressed picture data constituting the information on the target picture frame size, the maximum number of storable reconstructed pictures, and the maximum frame size to restore reconstructed pictures and the information on the target picture frame size, the maximum number of storable reconstructed pictures, and the maximum frame size, a picture storage module that stores one or more of the reconstructed pictures as reference pictures to be used for decoding a subsequent picture, and a memory control module that controls the picture storage module, wherein when a frame size of the input pictures is not more than 1/(2^L) (where L is an integer of one or more) of the maximum frame size of pictures, the memory control module determines that (2^L) times the maximum number of reconstructed pictures are storable in the frame memory.

Figure 7:
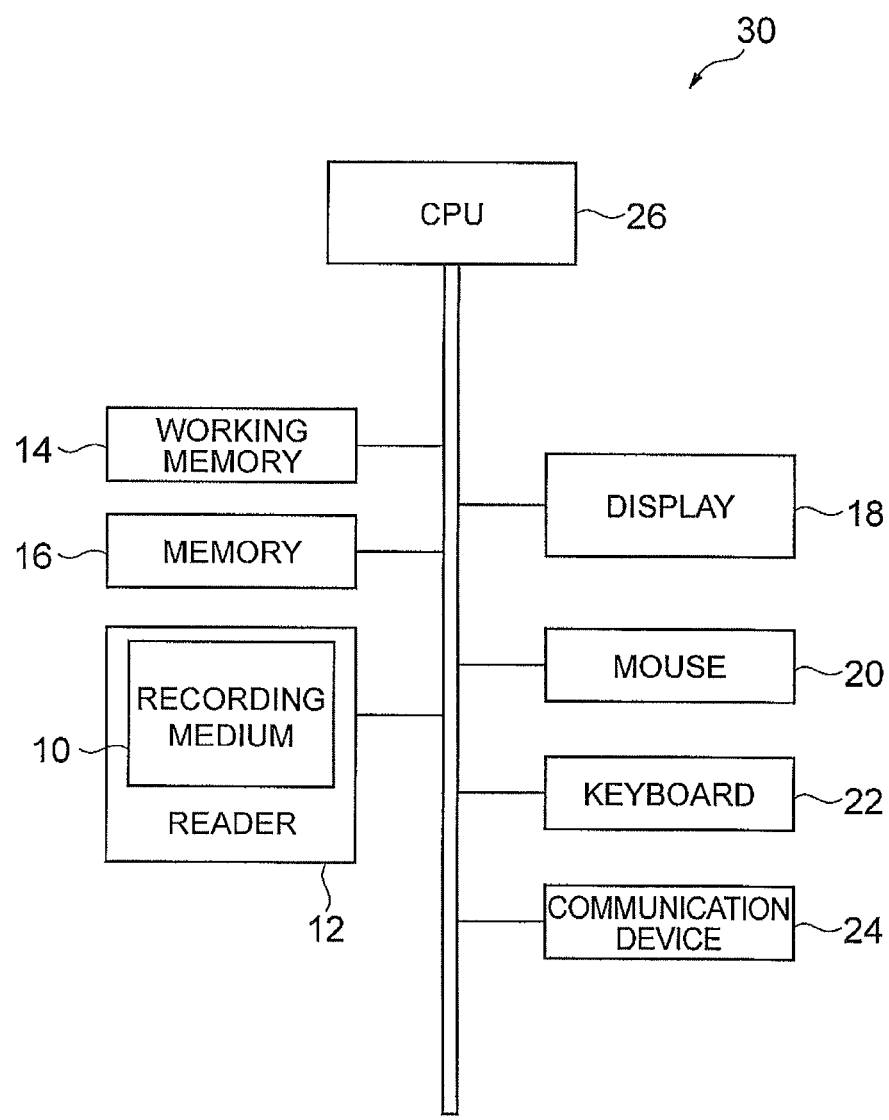
FIG. 7 is a drawing showing a hardware configuration of a computer for executing a program recorded in a recording medium.
Figure 8:
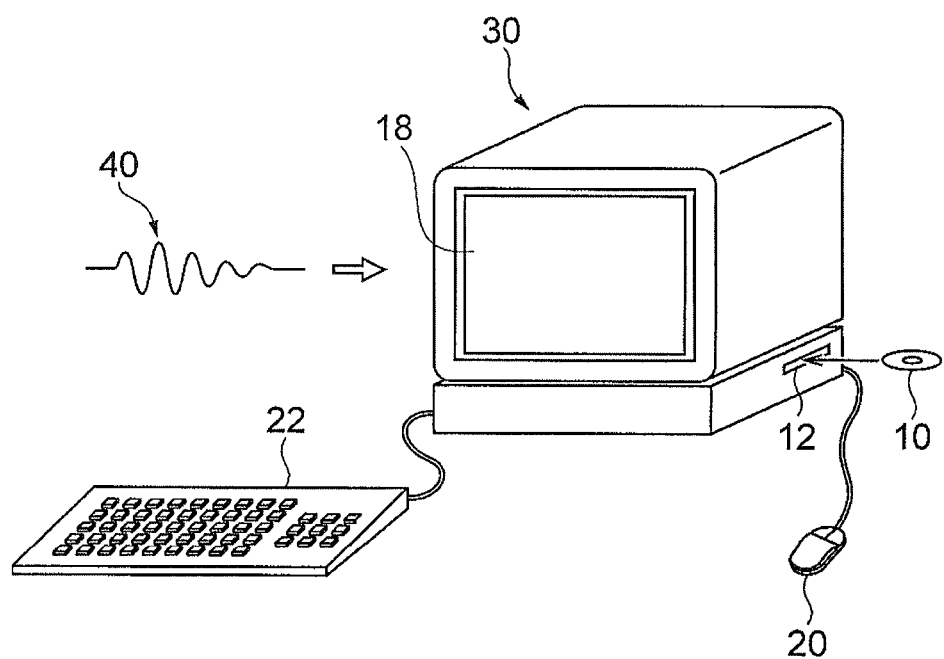
FIG. 8 is a perspective view of a computer for executing a program stored in a recording medium.

FIG. 7 is a drawing showing a hardware configuration of a computer for executing the program recorded in a recording medium and FIG. 8 a perspective view of a computer for executing the program stored in a recording medium. The computer includes a DVD player, a set-top box, a cell phone, etc. provided with a CPU and configured to perform processes and control by software.

As shown in FIG. 7, the computer 30 is provided with a reading device 12 such as a floppy (registered trademark) disk drive unit, a CD-ROM drive unit, or a DVD drive unit, a working memory (RAM) 14 on which an operating system is resident, a memory 16 for storing programs stored in the recording medium 10, a monitor unit 18 like a display, a mouse 20 and a keyboard 22 as input devices, a communication device 24 for transmission and reception of data or the like, and a CPU 26 for controlling execution of programs. When the recording medium 10 is put into the reading device 12, the computer 30 becomes accessible to the video prediction encoding or decoding program stored in the recording medium 10 through the reading device 12 and becomes able to operate as the video predictive encoding or decoding device according to the present invention, based on the video predictive encoding or decoding program.

As shown in FIG. 8, the video predictive encoding program or the video predictive decoding program may be provided in the form of computer data signal 40 superimposed on a carrier wave, through a network. In this case, the computer 30 can execute the video predictive encoding program or the video predictive decoding program after the video predictive encoding program or the video predictive decoding program received by the communication device 24 is stored into the memory 16.

LIST OF REFERENCE SIGNS 301 input terminal; 302 block division unit; 303 predictive signal generation unit; 304 frame memory; 305 subtraction unit; 306 transform unit; 307 quantization unit; 308 de-quantization unit; 309 inverse transform unit; 310 addition unit; 311 entropy encoding unit; 312 output terminal; 313 input terminal; 314 frame memory management unit; 401 input terminal; 402 data analysis unit; 403 de-quantization unit; 404 inverse transform unit; 405 addition unit; 406 output terminal; 407 frame memory; 408 predictive signal generation unit; 409 frame memory management unit.

What is claimed is:

1. A video predictive encoding device comprising:
   a CPU programmable to implement video predictive encoding;
   a receiver executable with the programmed CPU to receive a plurality of pictures forming a video sequence;
   an encoder executable with the programmed CPU to encode the received pictures by either intra-frame prediction or inter-frame prediction to generate compressed picture data;
   a decoder executable with the programmed CPU to decode the compressed picture data to reconstruct the pictures;
   a frame memory executable with the programmed CPU to store one or more of the reconstructed pictures as reference pictures to be used for encoding a subsequent picture; and
   a memory manager executable with the programmed CPU to manage the frame memory, the memory manager being executable to retrieve (i) a target picture frame size indicative of a frame size of a target picture, (ii) a maximum frame size (MaxLumaFS) defined in advance by level information and indicative of a maximum size of a reconstructed picture storable in the frame memory, and (iii) a size of the frame memory (MFSBuffer) expressed by a preset maximum number of reconstructed pictures storable in the frame memory,
   wherein the memory manager is further executable to:
   compare a halved MaxLumaFS with the target picture frame size;
   upon a determination that the halved MaxLumaFS is equal to or larger than the target picture frame size, double the MFSBuffer; and
   set an adaptive maximum number (maxDPBsize) of the reconstructed pictures storable in the frame memory equal to a doubled MFSBuffer, and
   wherein a number of the reconstructed pictures stored in the frame memory is no more than a number set in the maxDPBsize.

2. The video predictive encoding device according to claim 1, wherein the memory manager is further executable with the programmed CPU to:
   compare a quartered MaxLumaFS with the target picture frame size;
   upon a determination that the quartered MaxLumaFS is equal to or larger than the target picture frame size, quadruple the MFSBuffer; and
   set the maxDPBsize equal to a quadrupled MFSBuffer.

3. A video predictive decoding device comprising:
   a CPU programmed to implement video predictive decoding;
   a receiver executable with the CPU to receive encoded data comprising compressed picture data representative of a compressed form of a plurality of pictures forming a video sequence, wherein the plurality of pictures are encoded by either intra-frame prediction or inter-frame prediction;
   a decoder executable with the CPU to decode the compressed picture data to reconstruct the pictures;
   a decoded picture buffer (DPB) executable with the CPU to store one or more of the reconstructed pictures as reference pictures to be used for decoding a subsequent picture; and
   a buffer manager executable with the programmed CPU to manage the DPB, the buffer manager being executable to retrieve (i) a target picture frame size indicative of a frame size of a target picture, (ii) a maximum frame size (MaxLumaFS) defined in advance by level information and indicative of a maximum size of a reconstructed picture storable in the DPB, and (iii) a size of the frame memory (MFSBuffer) expressed by a preset maximum number of reconstructed pictures storable in the DPB,
   wherein the buffer manager is executable to:
   compare a halved MaxLumaFS with the target picture frame size;
   upon a determination that the halved MaxLumaFS is equal to or larger than the target picture frame size, double the MFSBuffer; and
   set an adaptive maximum number (maxDPBsize) of reconstructed pictures storable in the DPB equal to a doubled MFSBuffer, and
   wherein a number of the reconstructed pictures stored in the DPB is no more than a number set in the maxDPBsize.

4. The video predictive decoding device according to claim 3, wherein the buffer manager is further executable to:
   compare a quartered MaxLumaFS with the target picture frame size;
   upon a determination that the quartered MaxLumaFS is equal to or larger than the target picture frame size, quadruple the MFSBuffer; and
   set the maxDPBsize equal to a quadrupled MFSBuffer.

5. A video predictive encoding method executed by a video predictive encoding device, comprising:
   receiving a plurality of pictures forming a video sequence;
   encoding the received pictures by either intra-frame prediction or inter-frame prediction to generate compressed picture data;
   decoding the compressed picture data to reconstruct the pictures;
   storing one or more of the reconstructed pictures in a frame memory as reference pictures to be used for encoding a subsequent picture;
   retrieving (i) a target picture frame size indicative of a frame size of a target picture, (ii) a maximum frame size (MaxLumaFS) defined in advance by level information and indicative of a maximum size of a reconstructed picture storable in the frame memory, and (iii) a size of the frame memory (MFSBuffer) expressed by a preset maximum number of reconstructed pictures storable in the frame memory;
   comparing a halved MaxLumaFS with the target picture frame size;
   upon a determination that the halved MaxLumaFS is equal to or larger than the target picture frame size, doubling the MFSBuffer; and
   setting an adaptive maximum number (maxDPBsize) of the reconstructed pictures storable in the frame memory equal to a doubled MFSBuffer, and wherein a number of the reconstructed pictures stored in the frame memory is no more than a number set in the maxDPBsize.

6. The video predictive encoding method according to claim 5, further comprising:
comparing a quartered MaxLumaFS with the target picture frame size;
upon a determination that the quartered MaxLumaFS is equal to or larger than the target picture frame size, quadrupling the MFSBuffer; and
setting the maxDPBsize equal to a quadrupled MFSBuffer.

7. A video predictive decoding method executed by a video predictive decoding device, comprising:
receiving encoded data comprising compressed picture data representative of a compressed form of a plurality of pictures forming a video sequence, wherein the plurality of pictures are encoded by either intra-frame prediction or inter-frame prediction;
decoding the compressed form of the plurality of pictures to reconstruct the plurality of pictures;
storing in a decoded picture buffer (DPB) one or more of the reconstructed pictures as reference pictures to be used for decoding a subsequent picture;
retrieving (i) a target picture frame size indicative of a frame size of a target picture, (ii) a maximum frame size (MaxLumaFS) defined in advance by level information and indicative of a maximum size of a reconstructed picture storable in the DPB, and (iii) a size of the frame memory (MFSBuffer) expressed by a preset maximum number of reconstructed pictures storable in the DPB;
comparing a halved MaxLumaFS with the target picture frame size;
upon a determination that the halved MaxLumaFS is equal to or larger than the target picture frame size, doubling the MFSBuffer; and
setting an adaptive maximum number (maxDPBsize) of the reconstructed pictures storable in the DPB equal to a doubled MFSBuffer, and
wherein a number of the reconstructed pictures stored in the DPB is no more than a number set in the maxDPBsize.

8. The video predictive decoding method according to claim 7, further comprising:
comparing a quartered MaxLumaFS with the target picture frame size;
upon a determination that the quartered MaxLumaFS is equal to or larger than the target picture frame size, quadrupling the MFSBuffer; and
setting the maxDPBsize equal to a quadrupled MFSBuffer.

9. The video predictive decoding method according to claim 7, further comprising leaving memory pointers kept pointing storage locations of the DPB partitioned according to the MFSBuffer, after setting the maxDPBsize equal to the doubled MFSBuffer.

10. The video predictive decoding method according to claim 8, further comprising leaving memory pointers kept pointing storage locations of the DPB partitioned according to the MFSBuffer, after setting the maxDPBsize equal to the quadrupled MFSBuffer.

11. A non-transitory storage medium that stores a video predictive decoding program which programs a CPU to execute:
a receiver operable to receive encoded data comprising compressed picture data representative of a compressed form of a plurality of pictures forming a video sequence, wherein the plurality of pictures are encoded by either intra-frame prediction or inter-frame prediction;
a decoder operable to decode the compressed picture data to reconstruct the pictures;
a decoded picture buffer (DPB) operable to store one or more of the reconstructed pictures as reference pictures to be used for decoding a subsequent picture; and
a buffer manager operable to manage the DPB, the buffer manager being executable to retrieve (i) a target picture frame size indicative of a frame size of a target picture, (ii) a maximum frame size (MaxLumaFS) defined in advance by level information and indicative of a maximum size of a reconstructed picture storable in the DPB, and (iii) a size of the frame memory (MFSBuffer) expressed by a preset maximum number of reconstructed pictures storable in the DPB; and
wherein the buffer manager further operable to:
compare a halved MaxLumaFS with the target picture frame size;
upon a determination that the halved MaxLumaFS is equal to or larger than the target picture frame size, double the MFSBuffer; and
set an adaptive maximum number (maxDPBsize) of the reconstructed pictures storable in the DPB equal to a doubled MFSBuffer, and
wherein a number of the reconstructed pictures stored in the DPB is no more than a number set in the maxDPBsize.

* * * * *